United States Patent [19]

Kawano

[11] Patent Number: 5,939,129
[45] Date of Patent: Aug. 17, 1999

[54] PROCESS FOR PRODUCTION OF GROUND FISH MEAT PRODUCTS OR THEIR ANALOGUES

[76] Inventor: Nobuhisa Kawano, 36-15, Takadanobaba 4-chome, Shinjuku-ku, Tokyo 169, Japan

[21] Appl. No.: 08/808,440

[22] Filed: Feb. 28, 1997

[51] Int. Cl.$^6$ .................................................. A23L 1/325

[52] U.S. Cl. ........................ 426/643; 426/519; 426/573; 426/802

[58] Field of Search .................................. 426/573, 643, 426/519, 802

[56] References Cited

U.S. PATENT DOCUMENTS

| | | | |
|---|---|---|---|
| 4,557,942 | 12/1985 | Goodman | 426/643 |
| 4,752,492 | 6/1988 | Sato et al. | 426/643 |
| 4,794,007 | 12/1988 | Ozaki | 426/643 |
| 5,279,845 | 1/1994 | Nozaki et al. | 426/643 |
| 5,422,133 | 6/1995 | Yamamoto et al. | 426/643 |

FOREIGN PATENT DOCUMENTS

| | | |
|---|---|---|
| 355077879 | 6/1980 | Japan . |
| 355165776 | 12/1980 | Japan . |
| 363196238 | 8/1988 | Japan . |

*Primary Examiner*—Helen Pratt
*Attorney, Agent, or Firm*—Oblon, Spivak, McClelland, Maier & Neustadt, P.C.

[57] ABSTRACT

A process for production of ground fish meat products or their analogues, which uses, as the main raw material, non-salt ground fish meat along with a gel of glucomannan hydrate, or a gel of glucomannan hydrate only, and another process for production of ground fish meat products or their analogues, which uses, as the main raw material, non-salt, well-ground fish meat only, or non-salt, well-ground fish meat and a gel of glucomannan, salt-grinding not being involved in both the processes, and these fish meat products or their analogues being new and different in taste or texture from prior art ground fish meat products like Japanese kamaboko, and also being optionally lower in calories with the use of an increased proportion of glucomannan hydrate gel.

4 Claims, No Drawings

PROCESS FOR PRODUCTION OF GROUND FISH MEAT PRODUCTS OR THEIR ANALOGUES

BACKGROUND OF THE INVENTION

1. Field of the Invention

The present invention relates to a process for production of ground fish meat products or their analogues, and more particularly, first, to a process for production of ground fish meat products or their analogues, which comprises using, as the main raw material, non-salt ground fish meat, instead of the conventional salt ground fish meat, along with a gel of glucomannan hydrate, or a gel of glucomannan hydrate alone, and, second, to a process for production of ground fish meat products or their analogues, which comprises using, as the main raw material, non-salt, well-ground fish meat only, or non-salt, well-ground fish meat and a gel of glucomannan hydrate.

2. Description of Prior Art

Briefly, prior-art processes for production of ground fish meat products such as Japanese kamaboko comprise grinding fish meat with salt (i.e., sodium chloride) added thereto (i.e., salt-grinding) to make viscous paste, and molding and heating said paste into an elastic gel.

In greater details, in order to obtain elasticity, a certain physical taste (texture), for such-products, salt (e.g., ca 3% based on the starting fish meat) is added generally in three portions to said starting fish meat, and the mass is mixed and ground, whereby viscous ground fish meat is obtained wherein myofibrils of fish protein are mechanically disrupted and mixed, then said viscous ground fish meat is shaped into the shape of a desired product and subjected to suwari (i.e., setting), and, finally, the shaped material is heated so that the center of the material should be, for example, about 75° C., to give a hydrogel retaining water (i.e., prior-art ground fish meat product).

All of thus produced, prior-art ground fish meat products such as Japanese kamaboko, Japanese chikuwa, Japanese satsuma-age, fish ham or sausage, as well as Japanese narutomaki, Japanese datemaki, Japanese hampen, Japanese shinjo and the like exhibit their own particular gel-like textures, though salt-ground fish meat as the main raw material is common to all these products, since they are produced through their respective particular manufacturing steps, including their own auxiliary raw materials.

However, salt-grinding (i.e., grinding something such as fish meat together with salt, or grinding something with salt being added thereto), which is an essential step for treating the starting fish meat, limits various prior-art ground fish meat products in taste to within a certain range of similar kamaboko-like taste. For example, salt-grinding prevents kamaboko-type products from their use instead of animal meat for western dishes, for example, ingredients in curry.

In addition, in order to increase quantity or to control calorie (i.e., to reduce calorie), of ground fish meat products, various processes have been proposed and discussed, for example, a process wherein purified konnyaku powder, the main raw material for making konjak jelly (i.e., Japanese traditional food konnyaku), is, after hydrated/swollen and added/mixed with a coagulating agent, added to other raw materials, or a process which comprises blending vegetable gum, carrageenan, etc., with other raw materials. However, such processes fail to provide ground fish meat products with favorable texture peculiar to kamaboko, thus they are insufficient to attain their objects. Accordingly, the problems have not been solved yet.

PROBLEMS TO BE SOLVED BY THE INVENTION

Up to now, fish meat (including so-called Japanese frozen surimi, i.e., a kind of frozen fish meat paste), which is a common raw material for ground fish meat products, is subjected to salt-grinding, which is an essential step to obtain gels having their own texture peculiar to the respective final ground fish meat products, and the thus obtained viscous ground fish meat is made into the final products through their respective particular manufacturing steps. Accordingly, peculiar taste or texture of the conventional ground fish meat products essentially resembles that of kamaboko, which prevents them from their diversified applications for food.

The present inventor has paid attention to such facts, and an object of the present invention is to provide processes for production of ground fish meat products or their analogues having such gel-like texture as prior-art ground fish meat products, even without salt-grinding of the starting fish meat (i.e., without using salt-ground fish meat at all), salt-grinding being an essential step in conventional processes for production of ground fish meat products.

SUMMARY OF THE INVENTION

The present inventor has studied intensively to attain the above objects. As the results, he has found that ground fish meat products or their analogues, produced using fish meat ground without salt (i.e., non-salt ground fish meat) and a gel of glucomannan hydrate, or a gel of glucomannan hydrate only, retain texture resembling or superior to that of the conventional gel products such as kamaboko, even without salt-grinding of fish meat which has been considered to be an essential step. A first embodiment of the present invention has been attained based on such findings, and it relates to a process for production of ground fish meat products or their analogues, which comprises using, as the main raw material, non-salt ground fish meat along with a gel of glucomannan hydrate, or a gel of glucomannan hydrate only.

The present inventor has further studied and, as the results, found that non-salt ground fish meat when ground well (i.e., non-salt, well-ground fish meat) gives ground fish meat products having similar texture, and that a gel of glucomannan hydrate may be used together with such non-salt, well-ground fish meat. Thus, a second embodiment of the present invention relates to a process for production of ground fish meat products or their analogues, which comprises using, as the main raw material, non-salt, well-ground fish meat only, or non-salt, well-ground fish meat and a gel of glucomannan hydrate.

DETAILED DESCRIPTION OF THE INVENTION

First, the first embodiment of the present invention will be described.

Gel of glucomannan hydrate will be first explained, which has been newly employed in accordance with the present invention as one of the main raw materials or the main raw material for ground fish meat products or their analogues.

Konjak-imo, which is a plant belonging to the taro family, contains a large amount of polysaccharides, glucomannan (narrow sense) and other mannans, in its bulb. They are collectively referred to as glucomannan (broad sense), and also called as konnyaku-mannan (purified konnyak powder), because of its use as the main raw material for making commercially available konjak jelly, a Japanese traditional food konnyaku. Glucomannan to be used in the process of the present invention is not always required to be pure (glucomannan in the narrow sense) and konnyaku-mannan (a glucomannan in the broad sense) can be of course used. Accordingly, in the following description, glucomannans both in the narrow and the broad sense are collectively abbreviated simply to "mannan" unless it is particularly necessary to distinguish.

As is well known, an aqueous solution of mannan is gelled upon contact with an alkaline compound such as $Ca(OH)_2$ (a coagulating agent), and the resulting hydrated gel (i.e., a gel of mannan hydrate), when warmed or heated, gives an irreversible elastic gel, which is a Japanese traditional food konnyaku. More particularly, konnyaku is, for example, produced via a series of essential steps which comprises stirring mannan with water, leaving the mass for about 60 to 120 minutes to completely dissolve the mannan particles (mebiraki i.e., swelling of particles), subsequently adding a coagulating agent to the swollen mannan, completely blending the mixture to obtain a gel of mannan hydrate, thereafter molding the gel, and heating the molded gel to obtain an irreversible gel.

The characteristics of mannan have been utilized for food, for example, as konnyaku.

According to such process for production of konnyaku (i.e., konjak jelly), a large amount of water should be used upon preparation of an aqueous solution of mannan in order to completely dissolve mannan or to completely blend after addition of a coagulating agent. That is, it is preferable for such purposes to use 37 to 45 parts by weight of water based on 1 part by weight of mannan. For example, when water is used in an amount of less than 30 parts by weight, a strong hydrate gel results, which can hardly be blended completely upon addition of an alkaline agent (a coagulating agent) after swelling, and which can hardly be homogenized upon addition to other foodstuff.

However, to impart favorable texture to the ground fish meat products and their analogues of the present invention, according to the findings of the present inventor, a gel of mannan hydrate is composed of about 8 to 25, preferably about 12 to 22 parts by weight of water, per 1 part by weight of mannan, and 0.02 to 0.05 parts by weight of a coagulating agent in the case of $Ca(OH)_2$, per 1 part by weight of mannan. A composition within the above-mentioned ranges provides a good gel for the purposes of the present invention. In this connection, a preferred example of mannan, which can be used to give such a good gel of mannan hydrate without such steps of completely dissolving mannan in water and subsequent thoroughly blending with a coagulating agent as necessary in the production of konnyaku, includes mannan in the form of instantly soluble glucomannan according to the invention by the present inventor (Japanese Patent Application Laid-Open No. 38263/1993).

Mannan to be used in the process of the present invention is preferably in the form of powder and of course should be so purified as not to impart uncomfortable taste or odor to the products.

Further, fish meat to be ground without using salt (i.e., with no salt being added thereto) includes of course a kind of (frozen) fish meat paste (i.e., so-called Japanese (frozen) surimi).

The process for production of ground fish meat products and their analogues according to the present invention can be conducted according to conventionally known processes, including auxiliary materials, for production of ground fish meat products, except that as the main raw material is used fish meat ground without using salt (i.e., non-salt ground fish meat) along with mannan hydrate gel, or mannan hydrate gel alone. They can be produced using absolutely no auxiliary materials. Thus, diversified application of such kind of foodstuff for food can be attained.

Formerly, it is well known that kamaboko is, for example, produced from fish meat (paste) ground with salt (i.e., salt-ground fish meat) as the main raw material by blending it with auxiliary raw materials, e.g., seasonings such as sugar and umami-seasoning and elasticity reinforcing material such as starch, molding the blended mass, and heating the molded mass. Production processes of ground fish meat products referred to above, other than kamaboko, such as chikuwa, are also well-known to those skilled in the art.

Prior art processes for production of any ground fish meat products include a heating step as an essential one. Such heating step can also serve as a heating step to convert a mannan hydrate gel (i.e., gel of mannan hydrate) into an irreversible elastic gel.

When fish meat ground without using salt (i.e., non-salt ground fish meat) and a gel of mannan hydrate are simultaneously used as the main raw material, their ratio should be such that gel elasticity comparable to that of prior art ground fish meat products produced using salt-ground fish meat as the main raw material is imparted to the final products according to the present invention. With increase of the ratio of a gel of mannan hydrate, the ratio of non-salt ground fish meat will be reduced, which provides final products with less conventional kamaboko-like taste, that is, the products become away from the so-called ground fish meat products in the prior art and become their analogues (i.e., analogues of ground fish meat products in the prior art). In the extreme case, such analogues can be produced without using any non-salt ground fish meat, that is, by using a gel of mannan hydrate alone as the main raw material. Thus, diversified application of such kind of foodstuff has been attained.

Salt-ground fish meat may be used if in so small an amount as not to interfere the advantage of the present invention. Salt may be used in a small amount as a seasoning. Auxiliary raw materials may by previously added optionally to ground fish meat and/or gel of mannan hydrate during the step of preparation thereof. As mentioned above, the inventive products can be produced with absolutely no auxiliary raw materials at all.

Next, the second embodiment of the present invention, which relates, as mentioned above, to a process for production of ground fish meat products or their analogues, which comprises using, as the main raw material, non-salt, well-ground fish meat only, or non-salt, well-ground fish meat and a gel of glucomannan hydrate.

As has been described above in connection with the first embodiment of the present invention, the present inventor has found that addition of salt in the step of grinding fish meat (including that in the form of surimi, i.e., a kind of fish meat paste) (salt-grinding), which has been conventionally conducted as an essential step, can be eliminated by blending a gel of glucomannan hydrate with fish meat ground without using salt (i.e., non-salt ground fish meat) to reinforce the gel strength from said non-salt ground fish meat, whereby texture more favorable than that of the gel of kamaboko can be provided, and has attained a process for production of ground fish meat products and their analogues in accordance with the first embodiment of the present invention. After further intensive studies, the present inventor has found that non-salt ground fish meat, when obtained under certain grinding conditions, can provide sufficient gel strength, even if not supplemented with a gel of glucomannan hydrate, and has attained the second embodiment of the present invention based on such findings.

Conventional salt-grinding of fish meat is carried out by any one of the processes shown below:

(a) Grinding with a stone mill. This grinding is carried out using a stone mill equipped with a few rotating rods, wherein such rotating rods slowly rotate so that the contents in the mill should not be scattered out, for example, over 30 minutes or longer.

(b) Grinding using a silent cutter. Such grinding is conducted using a mixing-grinding machine called 'silent cutter', which cuts its contents such as fish meat with multiple metallic blades rotating longitudinally at a high speed in a slowly rotating stone or metallic mill (depth, ca 30 to 40 cm). Time required for grinding using such a silent cutter is, for example, not less than about 30 minutes.

(c) Grinding using a food cutter. It is, for example, carried out using a cylindrical container having two (upper and lower) sharp rotating blades (made of stainless steel) at the bottom of said container, the blades rapidly rotating (at 13,000 to 20,000 rpm) to cut the contents. Using this cutter, for example, cutting of meat for hamburger stake, etc. will be completed within about 20 seconds. In this case, the capacity of the cutter is generally not more than 800 g. Even a cutter for commercial use has a small capacity, i.e., not more than 2 kg. However, it is suitable to confirm physical properties of the articles made by way of trial.

(d) Grinding using a ball cutter. This comprises charging, for example, surimi (i.e., fish meat paste), and auxiliary materials and seasonings such as salt (about 3% by weight based on the surimi), a required amount of chilled water, starch and the like into a spherical tank made of stainless steel, putting on the lid, making the inside vacuous, and cutting and grinding the contents by rotating multiple rotating blades at a high speed of not less than 2,700 rpm for about 10 minutes. In this case, even if such vacuum state is changed to an open state, good ground fish meat of almost the same quality can be obtained by increasing a rotation speed of the rotating blades.

All of such conventional methods essentially utilizes salt (normally, 3% by weight based on surimi) at the beginning of the step of grinding surimi. In such grinding step (i.e., salt-grinding), the myosin portion of fish protein is disrupted by the osmotic pressure to give viscous ground surimi, which is shaped, and heated to attain the characteristic texture. This is the conventional process for production of ground fish meat products represented by kamaboko.

In the background of the above-described prior art, the present inventor has found that even by non-salt grinding without using salt, ground fish meat giving sufficient gel strength can be readily obtained, unless supplemented with a gel of glucomannan hydrate as in the first embodiment of the present invention, by increasing cutting time in the above food-cutter method (c), or by high-speed rotation of rotating blades in the ball-cutter method (d). In this case, it may be vacuum or opened state in the ball tank. The important thing is, for example, high-speed cutting of not less than 2,700 rpm is preferable in the ball tank, and the time required is, for example, about 10 minutes. To obtain effects of high-speed rotation, fluid such as chilled water, egg white, Japanese mirin are used in an amount of about 60 to 80% by weight based on the ground surimi. If no salt content derived from seasonings is desired, seasonings containing salt should be appropriately eliminated. For example, as for mirin, it may be replaced with chilled water.

On the other hand, in the case of the grinding method of (a) or (b) above, it is difficult to obtain a sufficiently viscous ground product of fish meat paste (i.e., so-called surimi) resultant from disruption of the myosin portion upon non-salt grinding, the product retaining dry and crumbling, lumpy texture with less bonding ability.

Judgment on whether or not a non-salt ground fish meat is to be supplemented in gel strength, can be made, as follows. For example, as for kamaboko, it can be given on the basis of whether particles present in surimi are disrupted in the resultant non-salt ground fish meat and the said resultant non-salt ground fish meat exhibits homogeneous and viscous properties and moldability and workability almost equal or superior to those of the conventional salt-ground fish meat paste (i.e., surimi). That is, it can be made based on whether the resultant kamaboko shows such properties as ashi (i.e., elasticity) which is texture characteristic of prior art kamaboko, or elastic properties. As for chikuwa, it can be made based on possibility of molding by winding using a chikuwa-producing machine. That is, a non-salt ground fish meat should be so viscous that the ground fish meat may not be scattered, otherwise it fails to be wound around the rotating shaft which rotates to mold the ground fish meat. And as for satsuma-age, it can be made on whether texture become rough and heterogeneous, and further hard and brittle upon frying non-salt ground fish meat, and on whether time required for frying is long or not. That is, if grinding of fish meat is insufficient, workability is insufficient, and further the resulting ground fish meat products fail to have high-quality of fine texture. Non-salt ground fish meat which has been ground so well that it does not particularly require supplement of gel strength is defined as "non-salt, well-ground fish meat" according to the present invention, regardless of its preparation processes.

The findings by the present inventor that even non-salt grinding without using salt can afford ground fish meat giving sufficient gel strength is extremely useful from the practical view point of the actual production of ground fish meat products, of the diversification of taste of ground fish meat products and of satisfying the demand to reduce salt content in food based on the health-oriented tendency. Further, it is extremely important from the scientific viewpoint. Formerly, actomyosin, which can be extracted from muscle with neutral saline of high concentration, can not be dissolved in water but in saline and has high viscosity. Sausage, kamaboko and the like are considered to result from coagulation and gelation upon heat treatment of thick actomyosin sol derived from fish meat completely mixed and ground with salt, and the elasticity characteristic of kamaboko is considered to be derived from formation of three dimensional net structure of actomyosin upon heat treatment (see "*Shokuhin Kogyo Sogo Jiten*", edited by Nippon Shokuhin Kogyo Gakkai, and published by Korin Kabushiki Kaisha in 1979, item "actomyosin"). Accordingly, it has been considered that production of ground fish meat products such as kamaboko essentially require salt-grinding of the starting raw material fish meat (paste) (see the above "*Jiten*", item "kamaboko"). That is, ground fish meat (paste) good for ground fish meat products has been considered to be obtained only by salt-grinding wherein osmotic pressure of salt works. However, the present inventor has found that non-salt ground fish meat alone can be used.

Accordingly, the second embodiment of the present invention relates to a process for production of ground fish meat products or their analogues, which comprises using, as the main raw material, non-salt, well-ground fish meat only, or non-salt, well-ground fish meat and a gel of glucomannan hydrate.

The second embodiment of the present invention per se will be illustrated in detail. This embodiment is the same as the first embodiment of the present invention except that non-salt ground fish meat is replaced by non-salt, well-ground fish meat, as will become apparent from the following.

Firstly, the main raw material, i.e., non-salt, well-ground fish meat will be explained.

Use of non-salt, well-ground fish meat provides deversification of taste of ground fish meat products, thereby satisfying the diversified public taste as well as demand for reducing salt consumption based on the health-oriented tendency.

The definition of non-salt, well-ground fish meat has been given above. Its production method has also been described above, i.e., it can be according to that of conventional salt-grinding except fish meat is well ground without using salt to such extent that the sufficient gel strength is provided. Of course, fish meat to be ground without addition of salt includes so-called surimi (i.e., a kind of fish meat paste).

Secondary, a gel of glucomannan hydrate, which can be used along with non-salt, well-ground fish meat as a main raw material, is the same as explained above in connection with the first embodiment of the present invention.

The process for production of ground fish meat products and their analogues according to the second embodiment of the present invention can, as in the case of the first embodiment of the present invention, be conducted according to conventionally known processes, including auxiliary materials, for production of ground fish meat products except that as the main raw material is used only fish meat well ground without using salt (i.e., non-salt, well-ground fish meat), or non-salt, well-ground fish meat along with a gel of glucomannan hydrate. They can be produced using absolutely no auxiliary materials. Thus, diversified application of such kind of foodstuff for food can be attained, as in the first embodiment of the present invention.

Conventionally known processes for production of ground fish meat products have been described above in connection with the first embodiment of the present invention.

As has been described above in connection with the first embodiment of the present invention, prior art processes for production of any ground fish meat products include a heating step as an essential one. Such heating step can also serve as a heating step to convert a mannan hydrate gel into an irreversible elastic gel.

When fish meat ground well without using salt (i.e., non-salt, well-ground fish meat) and a gel of mannan hydrate are simultaneously used as the main raw material, their ratio should be such that gel elasticity comparable to that of prior art ground fish meat products produced using salt-ground fish meat as the main raw material is imparted to the final products according to the present invention. With increase of the ratio of a gel of mannan hydrate, the ratio of non-salt, well-ground fish meat will be reduced, which provides final products with less conventional kamaboko-like taste, that is, the products become away from the so-called ground fish meat products in the prior art and become their analogues. In the extreme case, such analogues can be produced without using any non-salt, well-ground fish meat, that is, by using a gel of mannan hydrate alone as the main raw material. This aspect is, as has been described above, included in the first embodiment of the present invention.

As in the case of the first embodiment of the present invention, salt-ground fish meat may be used if in so small an amount as not to interfere the advantage of the present invention. Salt may be used in a small amount as a seasoning. Auxiliary raw materials may be previously added optionally to ground fish meat and/or a gel of mannan hydrate during the step of preparation thereof. As mentioned above, the inventive products can be produced with absolutely no auxiliary materials at all. These are all the same with the first embodiment of the present invention.

EXAMPLES

The present invention will be further illustrated by the following examples.

Example 1

(Case of larger ratio of ground fish meat):

Frozen fish meat paste (i.e., surimi) was cut into chips. 100 g of the chips, 8 g of sugar, 1 g of sodium glutamate and 1 g of salt (110 g in total) were, while 60 g of ice water being poured, ground together in a food cutter to obtain ground fish meat.

Separately, 20 g of an instantly soluble glucomannan composition consisting of 18 g of an about 200 mesh-through fine mannan powder, 1.6 g of carrageenan and 0.4 g of guar gum, 14 g of starch, 1 g of curdlan and 0.5 g of $Ca(OH)_2$ (35.5 g in total) were, after added with 420 g of water (20° C.), mixed with a hand mixer for about 4 minutes, when the glucomannan hydrate went in gelation so far that the hand mixer could not hardly rotate. Then, the resulting mass was press-kneaded for about 30–60 seconds to get the air bubbles out from within the mass, whereby a gel of glucomannan hydrate was prepared.

30 g of the thus prepared gel of glucomannan was added to 100 g of the separately prepared ground fish meat, and the mixture was brought into an equilibrated state by grinding with a silent cutter for about 5 minutes.

The ground mass was then press-spread to a thickness of about 7–10 mm, on a plate, and cut to rectangles of 50 mm×100 mm. Each rectangular piece was manually press-rolled between rollers to a thickness of about 2 mm, to give a strip of 80 mm in width and 220 mm in length. Each strip was cut to pieces about 40 mm wide and about 70 mm long. They were put in hot water (95° C.) and kept therein for about 20 minutes. Then, they were taken out onto a wire netting, whereby they got cooled down and their surface water was vaporized.

The thus prepared product was a peculiar gel entangled with fish meat-based and glucomannan-based materials, nonuniformly rugged, and wrinkled, which gave a good texture. Compared with kamaboko produced by the conventional process, it was hard to chew, different in peculiar flavour, easy to season, very compatible with various sauces and seasonings, and good as food material either cooked or noncooked.

Example 2

(Case of larger ratio of gel of glucomannan hydrate):

30 g of ground fish meat prepared in the same way as in Example 1 was added to water in the same amount (i.e., 420 g) as used to prepare a gel of glucomannan hydrate in that Example, and dispersed well enough therein by mixing with a hand mixer.

To the aqueous dispersion were added the same mixed raw materials except for water as used to prepare the gel of glucomannan hydrate in Example 1. The mixture was then mixed for about 4 minutes, and press-kneaded for about 30–60 seconds to get out the air bubbles, whereby a paste-like mass was obtained.

The paste-like mass was divided into 4 portions. Each portion was packed into a laminated resin bag, each packed bag weighing about 120 g. The packed bags were put in hot water (95° C.) and kept therein for about 40 minutes, whereby gelation was completed.

The thus prepared product was kamaboko-like in appearance but soft to masticate, different from kamaboko, had a texture like slices of raw tuna or yellowtail (i.e., Japanese tuna or yellowtail sashimi), gave a good texture, when cooked, like a high quality beef. It was also quite different in taste from kamaboko, compatible with various sauces and seasonings and good as food materials either cooked or noncooked, just like the product of Example 1.

Example 3

(Non-salted chikuwa):

Frozen fish meat paste (i.e., frozen surimi) (3 kg), ice water (2.2 kg), egg white (50 g), starch (250 g) and glucose (40 g) were respectively weighed (5.54 kg, in total).

Firstly, the frozen surimi (3 kg) was cut into chips of about 20 mm, which were further cut in a ball cutter (cutter for 10 kg prototype, manufactured by Stephen Corp.) with ice water (1,000 kg) at a high speed (3,600 rpm) for 3 minutes. Subsequently, ice water (600 g) and the egg white (50 g) were added and cut at the same high speed for 3 minutes, then the starch (250 g) and glucose (40 g) dissolved in the remaining ice water (600 g) were added and further cut for 4 minutes to obtain viscous ground surimi.

Time required for grinding in the ball cutter in the above operation was about 10 minutes, and the total time was about 15 minutes.

Subsequently, the resulting non-salt, well-ground fish meat was automatically molded around the winding rod of a chikuwa producing machine and grilled to be lightly browned while rotating, providing chikuwa of 100 mm in length, 25 mm in outer diameter and 5 mm in thickness. In this way, 148 pieces of chikuwa (about 35 g, each) were obtained.

Example 4

(Non-salted satsuma-age):

Ground surimi produced in the same manner as in Example 3 was molded in molds for satsuma-age (50 mm×80 mm×10 mm) and fried in a vegetable oil at 150 to 160° C. for 4.5 minutes.

In this way, 85 pieces of satsuma-age were produced. The weight of a single piece was about 60 g.

In this case, decrease of oil during frying was small, that is, the amount of oil absorbed by the satsuma-age product was small, which is preferred from the viewpoint of reduction of calorie.

Example 5

(Chikuwa from non-salt, well-ground surimi along with glucomannan hydrate gel):

Glucomannan powder (19.5 g), waxy starch (10.5 g) and calcium hydroxide (0.5 g) were added to water (400 g) (20° C.) with stirring using a whisk and stirred for about 4 minutes to provide hydrate paste, which was spread using a flexible resin spatula for about 1 minute and kneaded to prepare a highly viscous gel of glucomannan hydrate.

On the other hand, non-salt, well-ground surimi was prepared from the following materials: surimi (240 g), ice water (120 g), raw egg white (50 g), potato starch (30 g) and mirin (30 g) (470 g, in total). Firstly, surimi was cut into chips of about 20 mm, then charged into a food cutter, to which was added the potato starch (30 g) dissolved in ice water (120 g), and the resultant mixture was cut at a high speed (13,000 rpm) for 30 seconds. Subsequently, the raw egg white (50 g) and the mirin (30 g) were charged and further cut for 30 seconds, then the contents in the food cutter was integrated using a rubber spatula, then 15-minute cutting was repeated twice to grind, preparing non-salt, well-ground surimi.

To the resultant mass, the said gel of the above mannan hydrate (about 10 minutes after preparation) (50 g) was added, and cut for 30 seconds to provide materials in equilibrated state, which was then wound around a stainless steel pipe (a winding rod) of the same chikuwa producing machine as in Example 3 and grilled to produce 13 pieces of chikuwa (100 mm in length, 25 mm in outer diameter, 5 mm in thickness, and about 38 g, each).

The physical properties of the product were compared with those of the commercially available chikuwa. As the result, both pliability and elasticity (texture) were equal to those of the commercial products.

EFFECTS OF THE INVENTION

According to the present invention, uniform kamaboko-like taste can be improved by eliminating the salt-grinding step which has been an essential step for production of ground fish meat in the conventional process for production of ground fish meat. Further, in an extreme case, analogues of prior art ground fish meat products, having taste and texture different from those of the conventional ground fish meat products such as kamaboko can be obtained even without using auxiliary materials such as seasonings, by changing the ratio of fish meat type material to glucomannan-type material. Further, appropriate seasonings can be added to the intermediate products before complete gelation according to the present invention depending on the object. Accordingly, the inventive products, which can be optionally molded, can be utilized not only for Japanese dishes but for Western and Chinese dishes. That is, the present invention can contribute to advantageous utilization of fish meat resources and is of great economical advantage.

Today, our eating habits are diversified and Western food is changing our national food culture. Ground fish meat products represented by kamaboko, which is one of the traditional Japanese foods, are produced by grinding fish meat (including surimi, or fish meat paste) using salt (generally 3% of the starting fish meat), which is used as the main raw material. Seasonings have about 1.5% salt content. Accordingly, the products are salty. Such products are left behind the recent tendency to refrain from taking too much salt with the increase of health-oriented tendency. According to the present invention, non-salt grinding can provide products with lower salt content and glucomannan can reduce calorie. Accordingly, utilization of ground fish meat paste products for food can be diversified.

What is claimed is:

1. A process for production of a ground fish meat product, which comprises blending non-salt ground fish meat with a gel of mannan hydrate comprising 8–25 parts by weight water per 1 part by weight mannan, wherein said non-salt ground fish meat and gel are the main raw materials in said product.

2. The process of claim 1, wherein said mannan is glucomannan.

3. The process as claimed in claim 2, wherein said gel comprises 12–22 parts by weight water per 1 part by weight glucomannan.

4. The process as claimed in claim 1, wherein said gel comprises 12–22 parts by weight water per 1 part by weight mannan.

* * * * *